US011767017B2

(12) United States Patent
Nobutani et al.

(10) Patent No.: US 11,767,017 B2
(45) Date of Patent: Sep. 26, 2023

(54) TRAVEL MODE SWITCHING DEVICE FOR VEHICLE AND DISPLAY UNIT OF THE SAME

(71) Applicant: Mazda Motor Corporation, Hiroshima (JP)

(72) Inventors: Naoki Nobutani, Aki-gun (JP); Yasumasa Imamura, Aki-gun (JP); Daisuke Umetsu, Aki-gun (JP); Naoki Takata, Aki-gun (JP); Juntaro Matsuo, Aki-gun (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 17/716,272

(22) Filed: Apr. 8, 2022

(65) Prior Publication Data
US 2022/0340136 A1 Oct. 27, 2022

(30) Foreign Application Priority Data
Apr. 26, 2021 (JP) ................. 2021-074260

(51) Int. Cl.
*B60W 30/182* (2020.01)
*B60W 50/14* (2020.01)

(52) U.S. Cl.
CPC .......... *B60W 30/182* (2013.01); *B60W 50/14* (2013.01); *B60W 2530/203* (2020.02); *B60W 2540/215* (2020.02)

(58) Field of Classification Search
CPC .............. B60W 30/182; B60W 50/14; B60W 2530/10; B60W 2530/207; B60W 2050/146; B60Y 2300/28
See application file for complete search history.

(56) References Cited

U.S. PATENT DOCUMENTS

| 7,162,346 | B2 * | 1/2007 | Berry | ................... | B60W 10/20 701/1 |
| 9,199,640 | B2 * | 12/2015 | Weston | ........... | B60W 30/18145 |
| 11,097,612 | B1 * | 8/2021 | Imamura | .............. | B60K 17/348 |
| RE49,258 | E * | 10/2022 | Spillane | .............. | B60W 30/182 |
| 2006/0231314 | A1 * | 10/2006 | Homan | .................. | B60K 23/08 180/233 |

(Continued)

FOREIGN PATENT DOCUMENTS

JP 2019095265 A 6/2019

*Primary Examiner* — Tinh Dang
(74) *Attorney, Agent, or Firm* — Alleman Hall Creasman & Tuttle LLP

(57) ABSTRACT

A travel mode switching device for a vehicle is provided, which is switchable between a plurality of travel modes including a sport travel mode and a towing travel mode. The device includes a travel mode selection interface that allows a driver to select one of the travel modes, a towing detection sensor that detects a towing state, and a processor configured to execute a travel mode switching module to switch the travel mode to the travel mode selected by the travel mode selection interface, and a travel mode regulating module to regulate the selection of the sport travel mode by the travel mode selection interface when the towing state is detected by the towing detection sensor, and regulate the selection of the towing travel mode by the travel mode selection interface when the towing state is not detected.

6 Claims, 7 Drawing Sheets

(56) References Cited

U.S. PATENT DOCUMENTS

| | | | | |
|---|---|---|---|---|
| 2007/0032913 A1* | 2/2007 | Ghoneim | ............. | B60W 40/10 |
| | | | | 701/1 |
| 2015/0134162 A1* | 5/2015 | Yamazaki | ............. | B60W 10/08 |
| | | | | 903/906 |
| 2018/0058353 A1* | 3/2018 | Khafagy | ............... | B60R 16/033 |
| 2021/0197894 A1* | 7/2021 | Umetsu | ............... | B60W 30/045 |

* cited by examiner

TRAVEL MODE SWITCHING DEVICE FOR VEHICLE AND DISPLAY UNIT OF THE SAME

TECHNICAL FIELD

The present disclosure relates to a travel mode switching device for a vehicle, and a display unit of the same.

BACKGROUND OF THE DISCLOSURE

It is known that vehicles, such as four-wheel-drive vehicles, are configured to be switchable between a normal travel mode and a sport travel mode by a driver's selection. In the sport mode, for example, a vehicle is accelerated more by increasing a target acceleration than in the normal travel mode when stepping on an accelerator pedal. For example, JP2019-095265A discloses a vehicle, such as a four-wheel-drive vehicle, which is towable of another vehicle, such as a trailer.

In the vehicles, such as the four-wheel-drive vehicles provided with the normal travel mode and the sport travel mode as the travel mode, they may have a towing travel mode suitable for towing another vehicle as the travel mode, when they are configured to be able to tow another vehicle (towed vehicle). In the towing travel mode, for example, when rolling of the towed vehicle is detected, a brake device is activated to suppress the rolling.

When a plurality of travel modes including the sport travel mode and the towing travel mode are switchable therebetween by the driver's selection, the driver may erroneously select the sport travel mode which is not suitable for towing, while the vehicle is towing another vehicle. On the other hand, while the vehicle is not towing another vehicle, the driver may erroneously select the towing travel mode which is not suitable for a non-towing state.

Further, in vehicles provided with the plurality of travel modes including the sport travel mode and the towing travel mode which are switchable therebetween, even when the selectable travel modes are displayed on a display unit, and the driver operates a travel mode operation switch to select a travel mode from the plurality of travel modes including the sport travel mode and the towing travel mode which are displayed on the display unit, the driver may select a travel mode which is not suitable for towing.

SUMMARY OF THE DISCLOSURE

Thus, one purpose of the present disclosure is to allow a driver to appropriately set a travel mode according to a towing state, in a vehicle where a plurality of travel modes including a sport travel mode and a towing travel mode are switchable therebetween.

According to one aspect of the present disclosure, a travel mode switching device for a vehicle is provided, which is switchable between a plurality of travel modes including a sport travel mode and a towing travel mode. The device includes a travel mode selection interface that allows a driver to select one of the travel modes, a towing detection sensor that detects a towing state, and a processor configured to execute a travel mode switching module to switch the travel mode to the travel mode selected by the travel mode selection interface, and a travel mode regulating module to regulate the selection of the sport travel mode by the travel mode selection interface when the towing state is detected by the towing detection sensor, and regulate the selection of the towing travel mode by the travel mode selection interface when the towing state is not detected.

According to this configuration, since the selection of the sport travel mode by the travel mode selection interface is regulated when the towing state of the vehicle is detected, and the selection of the towing travel mode is regulated when the towing state is not detected, it can prevent a situation in which the sport travel mode is selected by the driver when the towing state is detected, or the towing travel mode is selected by the driver when the towing state is not detected, and therefore, the driver can select the travel mode according to the towing state.

A situation in which the travel mode is erroneously selected by the driver (for example, the driver erroneously selects the sport travel mode when the vehicle is in the towing state, or the driver erroneously selects the towing travel mode when the vehicle is not in the towing state) can be prevented, and therefore, the driver can appropriately set the travel mode according to the towing state.

The travel mode switching device may include a display unit that displays on a display screen an operation screen of the selectable travel modes. The travel mode selection interface may allow the driver to select one of the travel modes displayed on the operation screen. The travel mode regulating module may regulate so that the sport travel mode is not displayed on the operation screen when the towing state is detected by the towing detection sensor, and regulate so that the towing travel mode is not displayed on the operation screen when the towing state is not detected.

According to this configuration, the selectable travel modes are displayed on the operation screen. When the towing state of the vehicle is detected, the device regulates so that the sport travel mode is not displayed on the operation screen, and when the towing state is not detected, the device regulates so that the towing travel mode is not displayed on the operation screen. Therefore, the travel mode being erroneously selected by the driver (for example, the driver erroneously selects the sport travel mode when the vehicle is in the towing state, or the driver erroneously selects the towing travel mode when the vehicle is not in the towing state) can certainly be prevented.

Moreover, the device regulates so that the sport travel mode is not displayed on the operation screen when the towing state of the vehicle is detected, and the device regulates so that the towing travel mode is not displayed on the operation screen when the towing state is not detected. Since the sport travel mode and the towing travel mode can be switched and selectively displayed on the operation screen, the selectable travel mode can be displayed intelligibly on the operation screen, as compared with the case where the sport travel mode and the towing travel mode are displayed on the operation screen.

The travel mode may include other travel modes excluding the sport travel mode and the towing travel mode.

According to this configuration, when another travel mode other than the sport travel mode and the towing travel mode is set as the travel mode, a situation in which the sport travel mode is selected by the driver when the vehicle is in the towing state, or the towing travel mode is selected by the driver when the vehicle is not in the towing state, can be prevented. Thereby, the driver can select the travel mode according to the towing state.

The other travel modes may include a normal travel mode.

According to this configuration, when the normal travel mode, the sport travel mode, or the towing travel mode is set as the travel mode, a situation in which that the sport travel mode is selected by the driver when the vehicle is in the towing state, or the towing travel mode is selected by the driver when the vehicle is not in the towing state, can be prevented.

The other travel modes may include a normal travel mode and an off-road travel mode.

According to this configuration, when the normal travel mode, the off-road travel mode, the sport travel mode, or the towing travel mode is set as the travel mode, a situation in which the sport travel mode is selected by the driver when the vehicle is in the towing state, or the towing travel mode is selected by the driver when the vehicle is not in the towing state, can be prevented.

According to another aspect of the present disclosure, a display unit of a travel mode switching device for a vehicle is provided, the travel mode switching device configured to be switchable between a plurality of travel modes including a sport travel mode and a towing travel mode, the travel mode switching device including a travel mode selection interface that allows a driver to select one of the travel modes and a towing detection sensor that detects a towing state. The display unit includes a display screen that displays an operation screen of the travel modes selectable by the travel mode selection interface. The display unit is regulated by a processor configured to execute a travel mode regulating module so that the sport travel mode is not displayed on the operation screen when the towing state is detected by the towing detection sensor, and so that the towing travel mode is not displayed on the operation screen when the towing state is not detected.

According to this configuration, when the towing state is detected, the display unit is regulated so that the sport travel mode is not displayed on the operation screen, and when the towing state is not detected, the display unit is regulated so that the towing travel mode is not displayed on the operation screen. Therefore, the sport travel mode being selected by the driver when the towing state is detected, and the towing travel mode being selected by the driver when the towing state is not detected, can be prevented, and thereby, the driver can select the travel mode according to the towing state.

The driver erroneously selecting the travel mode (for example, the driver erroneously selects the sport travel mode when the vehicle is in the towing state, or the driver erroneously selects the towing travel mode when the vehicle is not in the towing state) can be prevented, and therefore, the driver can appropriately set the travel mode according to the towing state.

Further, since the display unit is regulated so that the sport travel mode is not displayed on the operation screen when the towing state is detected, and the display unit is regulated so that the towing travel mode is not displayed on the operation screen when the towing state is not detected, it can switch between and selectively display the sport travel mode and the towing travel mode on the operation screen, and therefore, the selectable travel modes can be displayed intelligibly on the operation screen, as compared with the case where the sport travel mode and the towing travel mode are displayed on the operation screen.

DETAILED DESCRIPTION OF THE DISCLOSURE

Hereinafter, one embodiment of the present disclosure is described with reference to the accompanying drawings.

Figure 1:
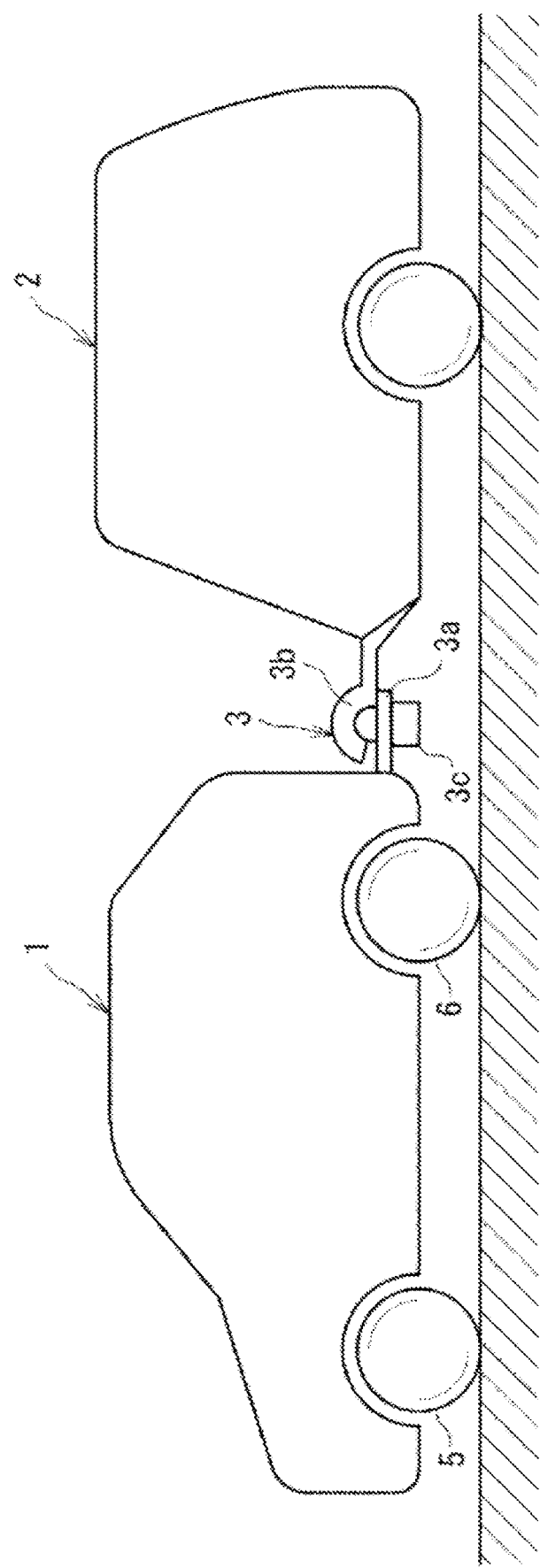
FIG. 1 is a schematic view illustrating a towing state of a vehicle provided with a travel mode switching device according to one embodiment of the present disclosure.

FIG. 1 is a schematic view illustrating a towing state of a vehicle provided with a travel mode switching device according to one embodiment of the present disclosure. As illustrated in FIG. 1, a vehicle (towing vehicle) 1 according to this embodiment of the present disclosure is configured to be towable of a trailer 2 as another vehicle to be towed (towed vehicle).

The trailer 2 is coupled to a rear part of the vehicle 1 via a coupling apparatus 3. The trailer 2 is formed so that the center-of-gravity position is located forward of the axle of the trailer 2. The vehicle 1 is configured in a towing state where it tows the trailer 2 so that a downward vertical load acts on a rear part of the vehicle 1 via the coupling apparatus 3.

The coupling apparatus 3 is comprised of a hitch member 3a provided to the rear part of the vehicle 1, and a coupler 3b provided to a front part of the trailer 2. The coupler 3b is formed couplable to the hitch member 3a. The hitch member 3a is provided with a towing detection sensor 3c which detects a towing state of the vehicle 1.

The towing detection sensor 3c is comprised of an energization sensor. The towing detection sensor 3c detects the towing state of the vehicle 1 by outputting an ON signal when the vehicle 1 is in the towing state, and outputs an OFF signal when the vehicle 1 is in a non-towing state where the vehicle 1 does not tow the trailer 2.

Figure 2:
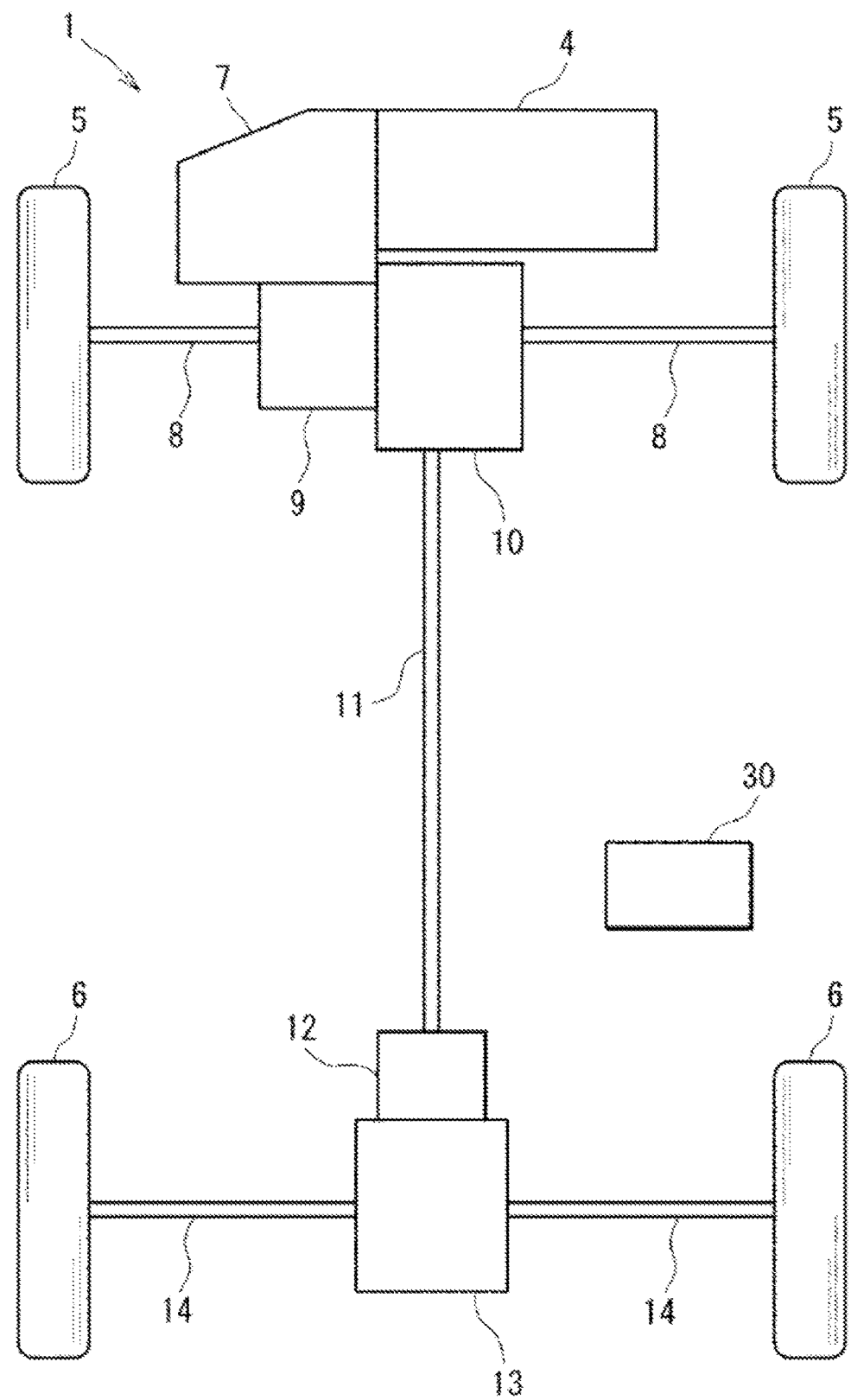
FIG. 2 is an outline configuration diagram of the vehicle.

FIG. 2 is an outline configuration diagram of the vehicle. As illustrated in FIG. 2, the vehicle 1 is a front-engine front-drive, four-wheel-drive vehicle in which an engine 4 as a driving source is disposed at a front part of the vehicle. The engine is transversely oriented and transmits the output of the engine 4 to front wheels 5.

The vehicle 1 includes the engine 4, an automatic transmission 7 for transmitting the driving torque of the engine 4 to the front wheels 5 and rear wheels 6, a differential gear 9 for the front wheels which transmits the driving force from the automatic transmission 7 to the left and right front wheels 5 via axles 8, a transfer 10 which is disposed on the axles 8 of the front wheels 5 and takes out the driving force to be transmitted to the rear wheels 6, a propeller shaft 11 which is coupled to the transfer 10 and extends in the front-and-rear direction, a coupling device 12 which is coupled to the propeller shaft 11 in the rear part of the vehicle and adjusts the driving force to be distributed into the front wheels 5 and the rear wheels 6, and a differential gear 13 for the rear wheels which is coupled to the coupling device 12 and transmits the driving force from the transfer 10 to the left and right rear wheels 6 via axles 14.

The automatic transmission 7 is configured to achieve a given gear stage according to the operating state of the vehicle 1 (in detail, according to a vehicle traveling speed and an accelerator opening). The transfer 10 is provided with a pair of bevel gears which mesh with each other in order to transmit the power from the differential gear 9 for the front wheels of which the axial center extends in the vehicle width direction to the propeller shaft 11 extending in the front-and-rear direction.

As for the coupling device 12, an electromagnetic coupling device may be used. The coupling device 12 adjusts the driving force to be distributed to the front wheels 5 and the rear wheels 6, for the output of the engine 4. The coupling device 12 can vary a torque distribution to the front wheels 5 and the rear wheels 6 within a range of [Front Wheel]:[Rear Wheel]=100:0 to 50:50.

The vehicle 1 has a brake device 15 (see FIG. 4) that generates a braking force of the vehicle 1 according to a stepping-on operation of a brake pedal. The brake device 15 is configured so that braking pressure generated in a master cylinder according to the stepping-on operation of the brake pedal is supplied to a wheel cylinder to cause the braking force on each wheel. The brake device 15 is also configured so that an electric motor for a hydraulic pump is driven, separately from the stepping-on operation of the brake pedal, and braking pressure is supplied to the wheel cylinder by the hydraulic pump to cause a braking force on each wheel.

The vehicle 1 is provided with a control unit 30 that controls configurations related to the vehicle 1, such as the engine 4, the automatic transmission 7, the coupling device 12, and the brake device 15. The control unit 30 performs various control based on various control information inputted. The control unit 30 is mainly comprised of a microcomputer including a processor (e.g., a central processing unit (CPU)) 30a, memory (e.g., ROM and/or RAM) 30b, etc.

The control unit 30 accepts signals inputted from a range sensor which detects a range of a shift lever, an engine speed sensor which detects an engine speed of the engine 4, a vehicle speed sensor which detects a vehicle speed, an acceleration sensor which detects an acceleration of the vehicle, a steering angle sensor which detects a steering angle of the vehicle, a fuel sensor which detects the residual quantity of fuel, a water temperature sensor which detects a temperature of the engine cooling water or coolant, an accelerator opening sensor which detects a stepping-on amount of an accelerator pedal, a braking pressure sensor which detects a braking pressure generated inside the master cylinder according to the stepping-on amount of the brake pedal, etc.

In the vehicle 1, the control unit 30 changes the driving torque of the engine 4 according to a steering operation by a driver to control the posture of the vehicle. The vehicle 1 controls the posture of the vehicle by reducing the driving torque of the engine 4 in an early stage of turning to cause deceleration in the vehicle 1 and quickly shifting the load toward the front wheels 5 to increase the grip force of the front wheels 5 so as to improve the stability of the vehicle against the steering operation.

Figure 3:
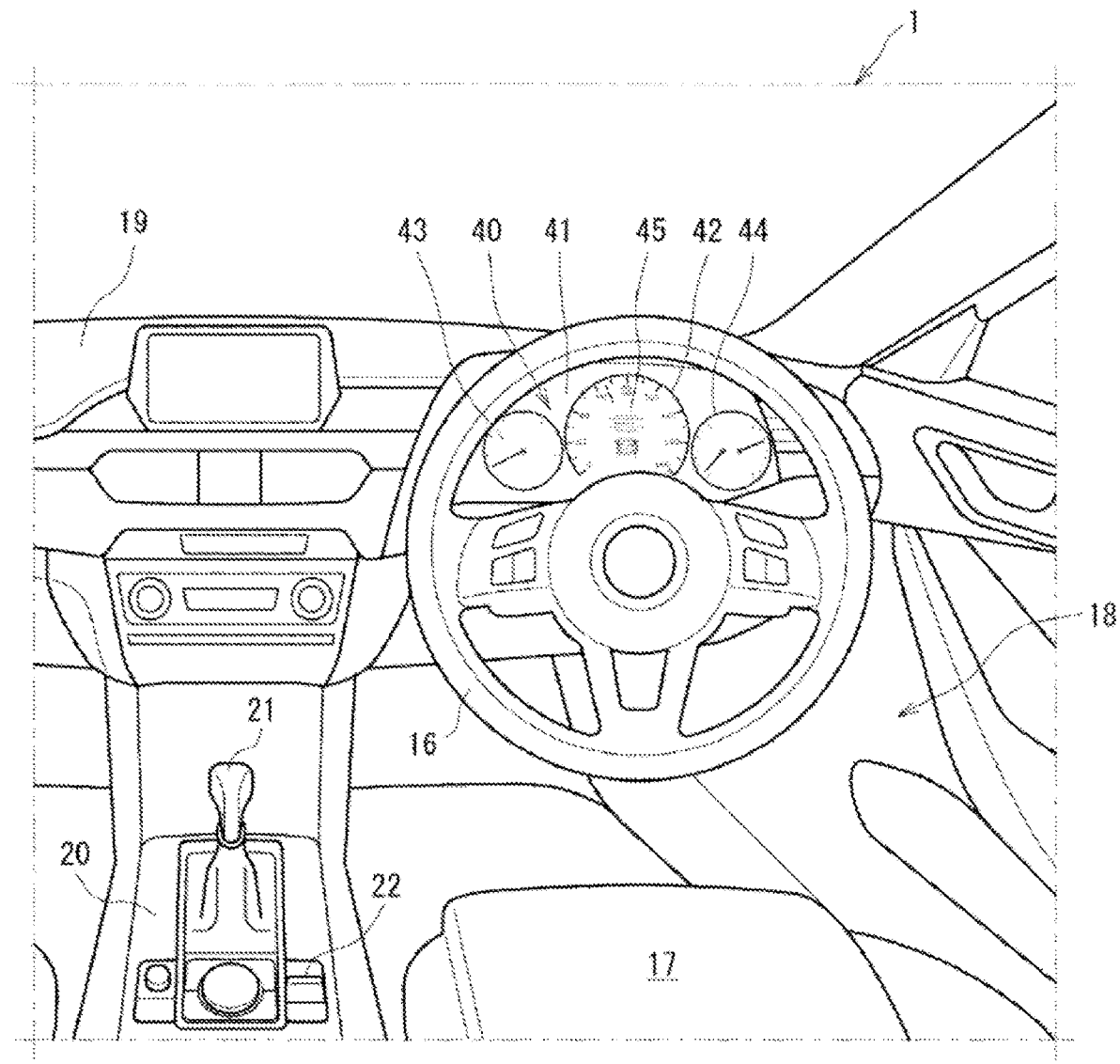
FIG. 3 is a view illustrating a cabin of the vehicle.

FIG. 3 is a view illustrating a cabin of the vehicle. As illustrated in FIG. 3, the vehicle 1 is a right-hand drive vehicle where a steering wheel 16 and a driver's seat 17 are disposed on the right side of the vehicle. The vehicle 1 is provided with a display unit 40 which displays meter images, etc. on the right side of a dashboard 19 disposed in a front part of a cabin 18. The display unit 40 has a display screen 41 which displays the meter images, etc. The display screen 41 is comprised of a liquid crystal display, for example.

Three meter indication areas 42, 43, and 44 are provided to the display screen 41 so as to be lined up in the vehicle width direction. For example, the meter indication area 42 disposed at the center in the vehicle width direction of the display screen 41 displays the vehicle speed, the meter indication area 43 disposed on the left side of the display screen 41 displays the engine speed, and the meter indication area 44 disposed on the right side of the display screen 41 displays the temperature of the engine coolant and the residual quantity of fuel. In this embodiment, an operation screen 45 of a travel mode is displayed on the display screen 41.

A center console part 20 extending in the front-and-rear direction is provided to the vehicle 1. The center console part 20 is coupled to the center of the dashboard 19 in the vehicle width direction, and is disposed on the center side of the driver's seat 17 in the vehicle width direction. In the center console part 20, a shift lever 21 for a shift operation of the automatic transmission 7, and a travel mode operation switch 22 as a travel mode selection interface with which the driver selects the travel mode are disposed.

The shift lever 21 is configured so that a range is selectable by the driver's operation from a P (parking) range, an R (reverse) range, an N (neutral) range, or a D (drive) range. The automatic transmission 7 is controlled according to the range of the shift lever 21 selected by driver's operation.

The travel mode operation switch 22 is tiltable in the front-and-rear direction from a neutral position where it extends upward so that the travel mode of the vehicle 1 is selectable by being operated. In the vehicle 1, a normal travel mode, a sport travel mode, a towing travel mode, and an off-road travel mode are prepared. The travel mode operation switch 22 is operable by the driver to select a travel mode from the normal travel mode, the sport travel mode, the towing travel mode, and the off-road travel mode.

In the vehicle 1, the travel mode of the vehicle 1 is switched to the travel mode selected by using the travel mode operation switch 22, and a travel control of the vehicle 1 is performed according to the selected travel mode.

As for each of the normal travel mode, the sport travel mode, the off-road travel mode, and the towing travel mode, a target acceleration characteristic is set beforehand based on the accelerator opening and the traveling speed, a transmission ratio characteristic of the automatic transmission 7 is set beforehand also based on the accelerator opening and the traveling speed.

In the normal travel mode, the target acceleration characteristic is set so that the target acceleration increases as the traveling speed decreases. In the normal travel mode, when the output torque of the engine 4 is controlled according to the target acceleration characteristic, a travel control of the vehicle in which an acceleration sensation is obtained at a low traveling speed and a high fuel efficiency is realized at a high traveling speed is performed to control the engine 4 and the automatic transmission 7 so that both traveling performance and fuel efficiency are achieved.

In the sport travel mode, the target acceleration is increased when stepping on the accelerator pedal, compared with the normal travel mode. In the sport travel mode, the travel control of the vehicle is performed so as to follow the driver's aggressive intention of "more acceleration" so that the engine 4 and the automatic transmission 7 are controlled to improve the traveling performance.

In the off-road travel mode, as compared with the normal travel mode, the target acceleration is reduced when stepping on the accelerator pedal, the braking force is increased when stepping on the brake pedal, the driving torque of the engine 4 is greatly reduced in the early stage of turning, an idle engine speed is increased, and the torque distribution to the rear wheels 6 is increased. In the off-road travel mode, the travel control of the vehicle suitable for an off-road traveling which is traveling a bad terrain is performed so that the engine 4, the automatic transmission 7, the brake device 15, and the coupling device 12 are controlled to increase a bad terrain handling ability.

In the towing travel mode, as compared with the normal travel mode, the braking force is increased when stepping on of the brake pedal, the driving torque of the engine 4 is greatly reduced in the early stage of turning, the torque distribution to the rear wheels 6 is increased, and the braking force for suppressing the rolling of the towed vehicle 2 is applied to the front wheels 5. In the towing travel mode, the travel control of the vehicle suitable for towing in which the vehicle 1 in the towing state is performed so that the engine 4, the automatic transmission 7, the brake device 15, and the coupling device 12 are controlled to increase the traveling stability during the towing.

Figure 4:
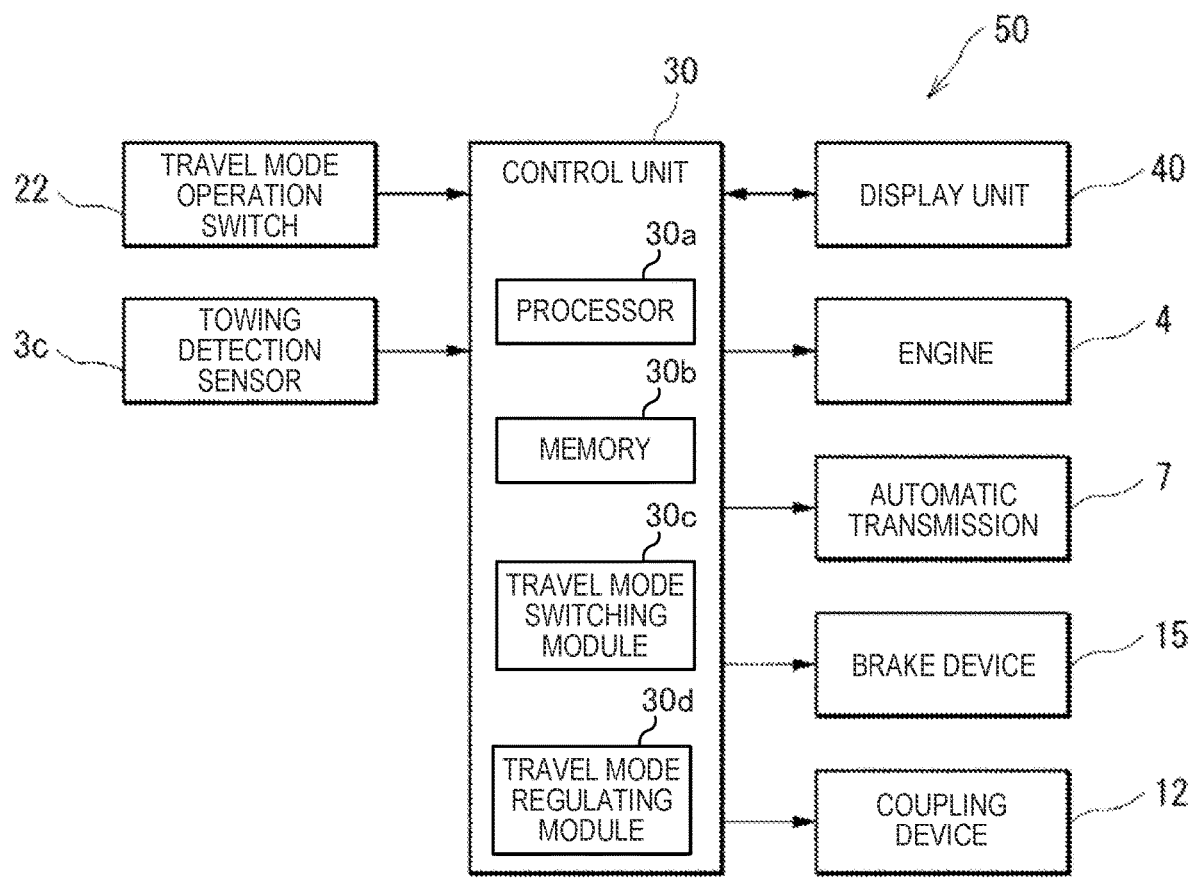
FIG. 4 is a block diagram illustrating a configuration of the travel mode switching device.

FIG. 4 is a block diagram illustrating a configuration of the travel mode switching device. A travel mode switching device 50 for the vehicle according to this embodiment is switchable of the travel mode by the driver's selection, and as illustrated in FIG. 4, it includes the travel mode operation switch 22, the towing detection sensor 3c, the display unit 40, the engine 4, the automatic transmission 7, the brake device 15, the coupling device 12, and the control unit 30. As described above, the travel mode switching device 50 also includes the range sensor, the engine speed sensor, the vehicle speed sensor, the acceleration sensor, the steering angle sensor, the fuel sensor, the water temperature sensor, the accelerator opening sensor, and the braking pressure sensor.

The control unit 30 controls the configurations related to the vehicle 1 so that it performs a display control of the operation screen 45 in the display screen 41 of the display unit 40, a travel mode switching control in which the travel mode of the vehicle is switched to the travel mode selected by the travel mode operation switch 22 to perform the travel control of the vehicle, and a travel mode regulating control in which, when the towing state of the vehicle 1 is detected by the towing detection sensor 3c, a selection of the sport travel mode is regulated, and, on the other hand, when the towing state of the vehicle 1 is not detected by the towing detection sensor 3c, a selection of the towing travel mode is regulated.

The travel mode regulating control regulates so that, when the towing state of the vehicle is detected, the sport travel mode is not displayed on the operation screen 45 where is selectively operated by the travel mode operation switch 22, and, on the other hand, when the towing state is not detected, the towing travel mode is not displayed on the operation screen 45 where is selectively operated by the travel mode operation switch 22.

In detail, when the towing state is detected, the control unit 30 displays the operation screen 45 where the towing travel mode, the normal travel mode, and the off-road travel mode are displayed but the sport travel mode is not displayed, and when the towing state is not detected, it displays the operation screen 45 where the sport travel mode, the normal travel mode, and the off-road travel mode are displayed but the towing travel mode is not displayed.

Further, the travel mode switching device 50 for the vehicle according to this embodiment is comprised of the travel mode operation switch 22, the display unit 40, the towing detection sensor 3c, and a travel mode regulating module 30d. When the towing state is detected, the display unit 40 is regulated so that the sport travel mode is not displayed on the operation screen 45, and when the towing state is not detected, the towing travel mode is not displayed on the operation screen 45.

Figure 5:
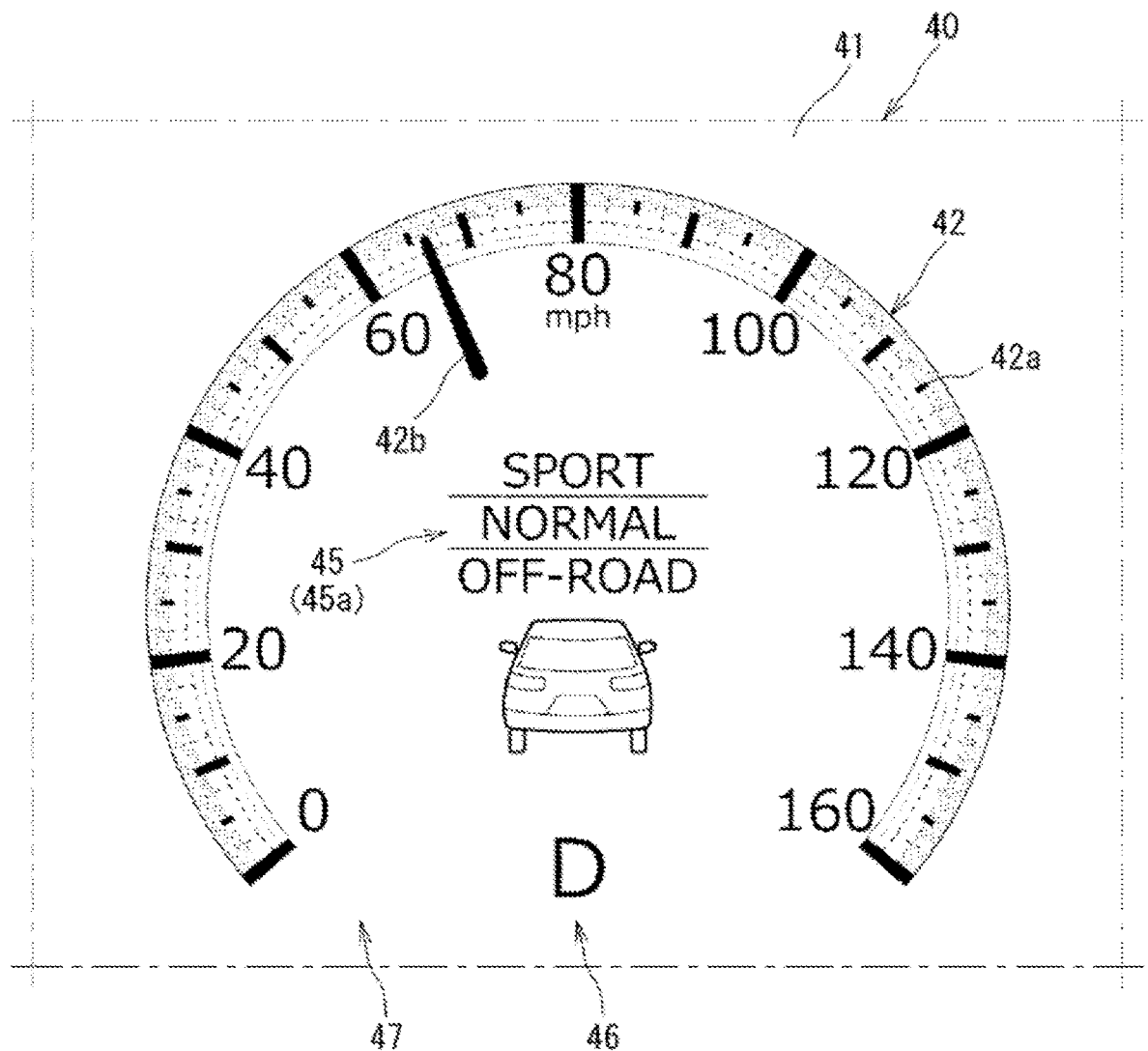
FIG. 5 is a view illustrating a display screen when the vehicle is in a non-towing state.

FIG. 5 is a view illustrating a display screen when the vehicle is in the non-towing state. As illustrated in FIG. 5, the meter indication area 42 which displays the traveling speed is displayed on the display screen 41 of the display unit 40. Displayed on the meter indication area 42 are a scale image 42a having an arc-shaped scale indicating vehicle speeds to be displayed radially at equal intervals, and a needle indicator image 42b which extends in the radial direction of the scale image 42a and indicates a current vehicle speed.

In the vehicle 1, the operation screen 45 for the travel mode which is selectively operated by the travel mode operation switch 22 is displayed on the display screen 41. The operation screen 45 is provided at the center of the meter indication area 42 which is easier to be visually recognized by the driver.

When the towing state is not detected, an operation screen 45a when in the non-towing state is displayed as the operation screen 45, as illustrated in FIG. 5. On the operation screen 45a, "SPORT" indicative of the sport travel mode, "NORMAL" indicative of the normal travel mode, and "OFF-ROAD" indicative of the off-road travel mode are displayed as the travel mode selection items from which one is selectable by the travel mode operation switch 22. "TOWING" indicative of the towing travel mode is not displayed on the operation screen 45a.

"SPORT," "NORMAL," and "OFF-ROAD" which are the travel mode selection items are displayed so as to be lined up in the up-and-down direction. When the operation screen 45a is displayed, it is first displayed in a state where the normal travel mode is selected, and a line is displayed on both the upper and lower sides of the characters of "NORMAL." In the vehicle 1, the travel control is performed in the normal travel mode.

The operation screen 45 is displayed so that the travel mode selection items which are selectively operated according to the tilting operation of the travel mode operation switch 22 are moved. It is displayed so that the travel mode selection item selectively operated is moved upwardly by a forward tilting operation of the travel mode operation switch 22, and the travel mode selection item selectively operated is moved downwardly by a rearward tilting operation of the travel mode operation switch 22.

Figure 6:
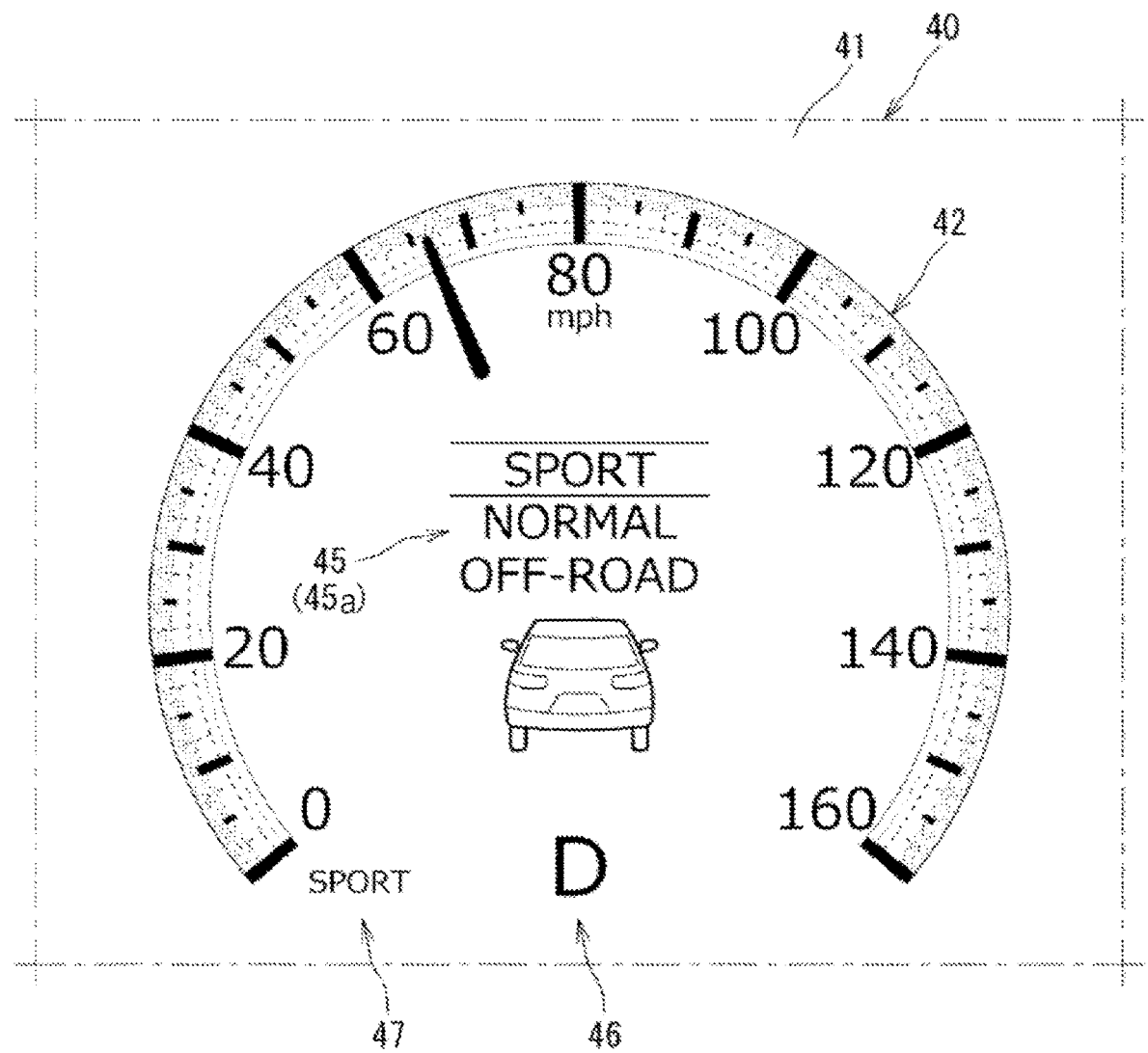
FIG. 6 is a view illustrating a display screen when a sport travel mode is selected.

FIG. 6 is a view illustrating a display screen when the sport travel mode is selected. When a forward tilting operation of the travel mode operation switch 22 is performed by the driver and the sport travel mode is selected on the operation screen 45a illustrated in FIG. 5, the lines are displayed on both the upper and lower sides of the characters of "SPORT" as illustrated in FIG. 6, the sport travel mode is selected, and the travel mode of the vehicle is switched. In the vehicle 1, the travel control is performed in the sport travel mode.

When a rearward tilting operation of the travel mode operation switch 22 is performed by the driver and the off-road travel mode is selected on the operation screen 45a illustrated in FIG. 5, the lines are displayed on both the upper and lower sides of the characters of "OFF-ROAD," the off-road travel mode is selected, and the travel mode of the vehicle is switched. In the vehicle 1, the travel control is performed in the off-road travel mode.

On the operation screen 45a, when a forward or rearward tilting operation of the travel mode operation switch 22 is performed by the driver from a state where the sport travel mode or the off-road travel mode is selected, respectively, to select the normal travel mode, the normal travel mode is selected and the travel mode of the vehicle is switched. In the vehicle 1, the travel control is performed in the normal travel mode.

Figure 7:
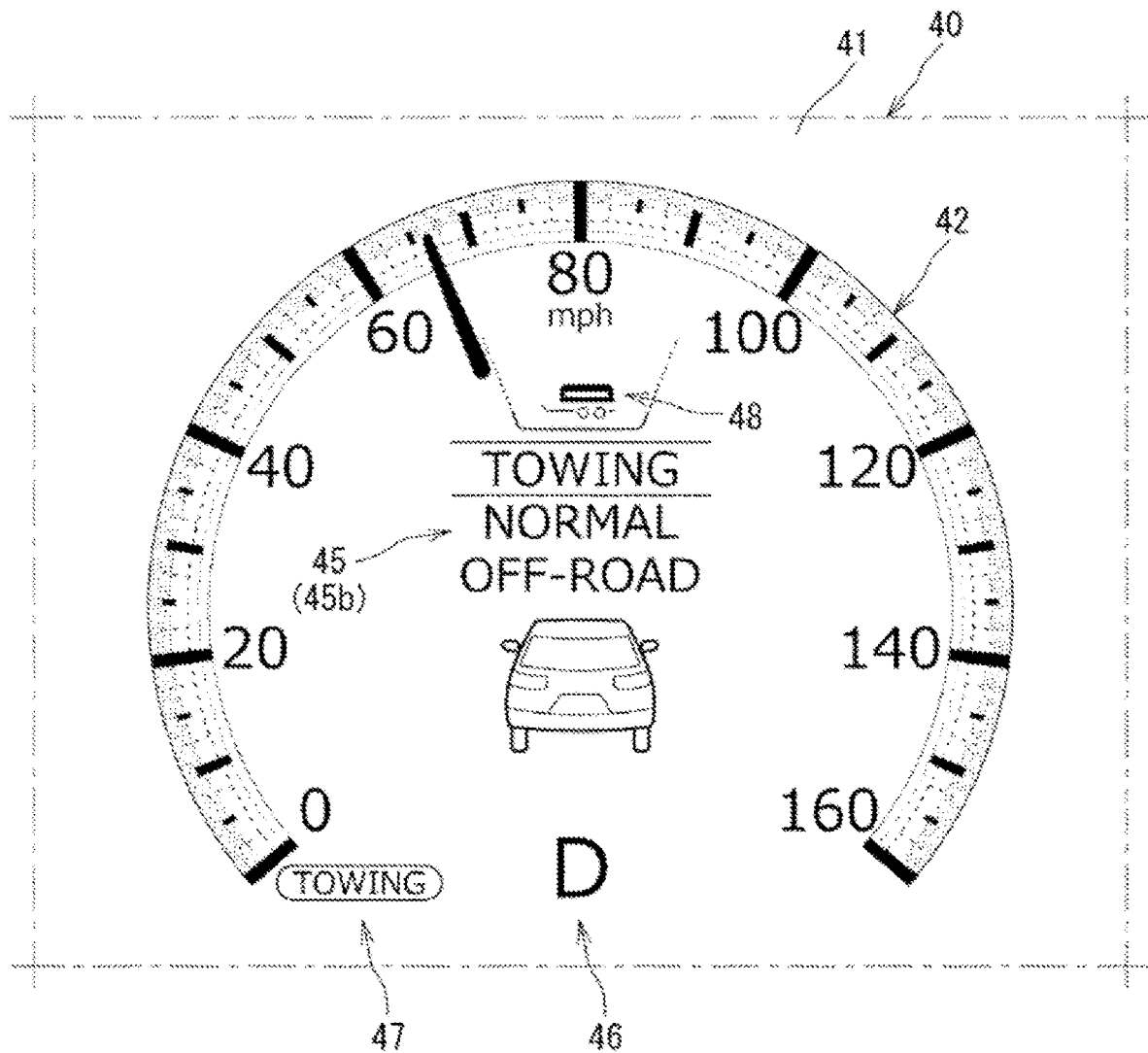
FIG. 7 is a view illustrating a display screen when the vehicle is in a towing state.

FIG. 7 is a view illustrating a display screen when the vehicle is in the towing state. When the towing state of the vehicle 1 is detected, an operation screen 45*b* when in the towing state is displayed as the operation screen 45, as illustrated in FIG. 7. On the operation screen 45*b*, "TOWING" indicative of the towing travel mode, "NORMAL" indicative of the normal travel mode, and "OFF-ROAD" indicative of the off-road travel mode are displayed as the travel mode selection items which are selectable by the travel mode operation switch 22. "SPORT" indicative of the sport travel mode is not displayed on the operation screen 45*b*.

"TOWING," "NORMAL," and "OFF-ROAD" which are the travel mode selection items are displayed so as to be lined up in the up-and-down direction. When the operation screen 45*b* is displayed, first, it is displayed in a state where the normal travel mode is selected, and the lines are displayed on both the upper and lower sides of the characters of "NORMAL." In the vehicle 1, the travel control is performed in the normal travel mode.

On the operation screen 45*b*, when a forward tilting operation of the travel mode operation switch 22 is performed by the driver from a state where the normal travel mode is selected to select the towing travel mode, the lines are displayed on both the upper and lower sides of the characters of "TOWING" as illustrated in FIG. 7, the towing travel mode is selected, and the travel mode of the vehicle is switched. In the vehicle 1, the travel control is performed in the towing travel mode.

On the operation screen 45*b*, when a rearward tilting operation of the travel mode operation switch 22 is performed by the driver from a state where the normal travel mode is selected to select the off-road travel mode, the lines are displayed on both the upper and lower sides of the characters of "OFF-ROAD," the off-road travel mode is selected, and the travel mode of the vehicle is switched. In the vehicle 1, the travel control is performed in the off-road travel mode.

Also on the operation screen 45*b*, when a forward or rearward tilting operation of the travel mode operation switch 22 is performed by the driver from a state where the towing travel mode or the off-road travel mode is selected, respectively, to select the normal travel mode, the normal travel mode is selected and the travel mode of the vehicle is switched. In the vehicle 1, the travel control is performed in the normal travel mode.

In the vehicle 1, the travel mode switching control for switching the travel mode of the vehicle 1 to the travel mode selected by the travel mode operation switch 22 is executed by the control unit 30. The control unit 30 reads various signals from the travel mode operation switch 22, the towing detection sensor 3*c*, etc.

Then, it is determined whether the towing state is detected, and if the towing state is detected, the operation screen 45*b* is displayed, and a selection of the sport travel mode by using the travel mode operation switch 22 is regulated, and on the other hand, if the towing state is not detected, the operation screen 45*a* is displayed, and a selection of the towing travel mode by using the travel mode operation switch 22 is regulated.

The control unit 30 regulates so that the sport travel mode is not displayed on the operation screen 45 when the towing state is detected, and regulates so that the towing travel mode is not displayed on the operation screen 45 when the towing state is not detected.

Further, when the towing state is detected or when the towing state is not detected, the control unit 30 detects the travel mode selected by using the travel mode operation switch 22 from the state where the normal travel mode is selected, the travel mode of the vehicle is switched to the selected travel mode, and the travel control of the vehicle 1 is performed. When the travel mode selected by the travel mode operation switch 22 is not detected from the state where the normal travel mode is selected, it performs the travel control in the normal travel mode.

The control unit 30 includes a travel mode switching module 30*c* which switches the travel mode of the vehicle 1 to the travel mode selected by the travel mode operation switch 22. In addition, the control unit 30 includes the travel mode regulating module 30*d* which regulates the selection of the sport travel mode when the towing state is detected, and regulates the selection of the towing travel mode when the towing state is not detected. These modules are stored in memory 30*b* of the control unit 30 and are executable by the processor 30*a* to perform their respective functions. When the towing state is detected, the control unit 30 regulates so that the sport travel mode is not displayed on the operation screen 45, and when the towing state of the vehicle 1 is not detected, the control unit 30 regulates so that the towing travel mode is not displayed on the operation screen 45.

Thus, in the vehicle 1, when the towing state is detected, the selection of the sport travel mode is regulated, and the switching the travel mode to the sport travel mode is regulated. In the vehicle 1, when the towing state is not detected, the selection of the towing travel mode is regulated, and the switching as the travel mode to the towing travel mode is regulated.

As illustrated in FIGS. 5 to 7, in the display screen 41, a range indication area 46 which displays the range of the shift lever 21 is provided below the operation screen 45. When the shift lever 21 is selected as D-range, "D" indicative of the D-range is displayed in the range indication area 46. When P-range, R-range, or N-range is selected, "P," "R," or "N" is displayed, respectively.

In the display screen 41, a travel mode indication area 47 which displays the travel mode of the vehicle is provided on the left side of the range indication area 46. As illustrated in FIG. 6, "SPORT" is displayed in the travel mode indication area 47 when the sport travel mode is selected, and, as illustrated in FIG. 7, "TOWING" is displayed in the travel mode indication area 47 when the towing travel mode is selected. Further, when the off-road travel mode is selected, "OFF-ROAD" is displayed in the travel mode indication area 47. As illustrated in FIG. 5, when it is in the normal travel mode, the travel mode is not displayed in the travel mode indication area 47. By displaying the travel mode in the travel mode indication area 47, the driver can recognize the current travel mode.

As illustrated in FIG. 7, also in the display screen 41, when the towing travel mode is selected, an illustrative picture 48 imitating the trailer 2 which is the towed vehicle is displayed above the operation screen 45. By displaying the travel mode in the travel mode indication area 47, the driver can recognize the current travel mode, and by displaying the illustrative picture 48, the driver can intuitively recognize the towing state.

In this embodiment, although the normal travel mode, the sport travel mode, the towing mode, and the off-road mode are set as the travel mode, the off-road mode may not be provided. Alternatively, other travel modes, such as a snow mode suitable for traveling on a snowy road, may be provided.

Further, the travel control of the vehicle in the sport travel mode, the off-road travel mode, and the towing travel mode is not limited to the travel control described above, the travel control suitable for each of the sport traveling, the off-road traveling, and the towing traveling may be set.

As described above, the travel mode switching device 50 for the vehicle according to this embodiment includes the travel mode switching module 30c which switches the travel mode of the vehicle to the travel mode which is selected by the travel mode selection interface (travel mode operation switch 22), and the travel mode regulating module 30d which regulates the selection of the sport travel mode when the towing state of the vehicle 1 is detected by the towing detection sensor 3c, and regulates the selection of the towing travel mode when the towing state is not detected by the towing detection sensor 3c.

Thus, since the selection of the sport travel mode is regulated when the towing state is detected, and the selection of the towing travel mode is regulated when the towing state is not detected, it can prevent that the sport travel mode is selected by the driver when the towing state is detected, and that the towing travel mode is selected by the driver when the towing state is not detected, and therefore, the driver can select the travel mode according to the towing state.

It can prevent that the travel mode is erroneously selected by the driver (for example, the driver erroneously selects the sport travel mode when the vehicle is in the towing state, or the driver erroneously selects the towing travel mode when the vehicle is not in the towing state), and therefore, the driver can appropriately set the travel mode according to the towing state.

Further, the display unit 40 which displays in the display screen 41 the operation screen 45 for the travel modes which is selectable is provided. The travel mode selection interface is configured to be selectable by the driver of a travel mode from the travel modes displayed on the operation screen 45. The travel mode regulating module 30d regulates so that the sport travel mode is not displayed on the operation screen 45 when the towing state is detected, and regulates so that the towing travel mode is not displayed on the operation screen 45 when the towing state is not detected.

Thus, the selectable travel modes are displayed on the operation screen 45. When the towing state of the vehicle 1 is detected, the control unit 30 regulates so that the sport travel mode is not displayed on the operation screen 45, and when the towing state is not detected, the control unit 30 regulates so that the towing travel mode is not displayed on the operation screen 45. Therefore, it can certainly prevent that the travel mode is erroneously selected by the driver (for example, the driver erroneously selects the sport travel mode when the vehicle 1 is in the towing state, or the driver erroneously selects the towing travel mode when the vehicle is not in the towing state).

Moreover, the control unit 30 regulates so that the sport travel mode is not displayed on the operation screen 45 when the towing state is detected, and the control unit 30 regulates so that the towing travel mode is not displayed on the operation screen 45 when the towing state is not detected. Therefore, the sport travel mode and the towing travel mode can be switched and selectively displayed on the operation screen 45, and the selectable travel mode can be displayed intelligibly on the operation screen 45 as compared with the case where the sport travel mode and the towing travel mode are displayed on the operation screen.

Further, the travel mode switching device 50 for the vehicle according to this embodiment includes the travel mode selection interface which allows a selection of the travel mode, the display unit 40 which displays in the display screen 41 the operation screen 45 for the travel modes which are selectable by the travel mode selection interface, the towing detection sensor 3c which detects the towing state of the vehicle, and the travel mode regulating module 30d which regulates so that the sport travel mode is not displayed on the operation screen 45 when the towing state is detected, and regulates so that the towing travel mode is not displayed on the operation screen 45 when the towing state is not detected.

Thus, when the towing state is detected, the control unit 30 regulates so that the sport travel mode is not displayed on the operation screen 45, and when the towing state is not detected, the control unit 30 regulates so that the towing travel mode is not displayed on the operation screen 45. Therefore, the sport travel mode being selected by the driver when the towing state is detected, and the towing travel mode being selected by the driver when the towing state is not detected, can be prevented, and thereby, the driver can select the travel mode according to the towing state.

Further, the driver can be prevented from erroneously selecting the travel mode (for example, the driver erroneously selects the sport travel mode when the vehicle is in the towing state, or erroneously selecting the towing travel mode when the vehicle is not in the towing state), and therefore, the driver can appropriately set the travel mode according to the towing state.

Further, since the control unit 30 regulates so that the sport travel mode is not displayed on the operation screen 45 when the towing state is detected, and the control unit 30 regulates so that the towing travel mode is not displayed on the operation screen 45 when the towing state is not detected, the display unit 40 can switch between and selectively display the sport travel mode and the towing travel mode on the operation screen 45, and therefore, the selectable travel modes can be displayed intelligibly on the operation screen 45 as compared with the case where the sport travel mode and the towing travel mode are displayed on the operation screen 45.

In this embodiment, although the vehicle 1 is the front-engine front-drive, four-wheel-drive vehicle with the transversely-oriented engine, it may be other vehicles, such as a front-engine rear-drive, four-wheel-drive vehicle with a longitudinally-oriented engine. Although the vehicle 1 is the right-hand drive vehicle, it may be a left-hand drive vehicle.

The present disclosure is not limited to the illustrated embodiment, and various improvements and design changes are possible without departing from the spirit of the present disclosure.

As described above, according to the present disclosure, in the vehicle which is configured to be switchable between a plurality of travel modes including the sport travel mode and the towing travel mode, since the driver is able to appropriately set the travel mode according to the towing state, it may be suitably utilized in a manufacturing field of such a kind of vehicle.

It should be understood that the embodiments herein are illustrative and not restrictive, since the scope of the invention is defined by the appended claims rather than by the description preceding them, and all changes that fall within metes and bounds of the claims, or equivalence of such metes and bounds thereof, are therefore intended to be embraced by the claims.

DESCRIPTION OF REFERENCE CHARACTERS

1 Vehicle
2 Trailer
3c Towing Detection Sensor
21 Shift Lever
22 Travel Mode Operation Switch
30 Control Unit
40 Display Unit
41 Display Screen
45, 45a, 45b Operation Screen
50 Travel Mode Switching Device for Vehicle

What is claimed is:

1. A travel mode switching device for a vehicle, configured to be switchable between a plurality of travel modes including a normal mode, a sport travel mode, and a towing travel mode, comprising:
 a travel mode selection interface that allows a driver to select one of the travel modes;
 a towing detection sensor that detects a towing state;
 a processor configured to execute:
  a travel mode switching module to switch the travel mode to the travel mode selected by the travel mode selection interface; and
  a travel mode regulating module to regulate the selection of the sport travel mode by the travel mode selection interface when the towing state is detected by the towing detection sensor, and regulate the selection of the towing travel mode by the travel mode selection interface when the towing state is not detected; and
 a display unit that displays on a display screen an operation screen of the selectable travel modes, wherein
 the travel mode selection interface allows the driver to select one of the travel modes on the operation screen,
 the travel mode regulating module regulates so that, when the towing state is detected by the towing detection sensor, the normal mode and the towing travel mode are displayed as the selectable travel modes, and the sport travel mode is not displayed on the operation screen, and
 the travel mode regulating module regulates so that, when the towing state is not detected by the towing detection sensor, the normal mode and the sport travel mode are displayed as the selectable travel modes, and the towing travel mode is not displayed on the operation screen.

2. The travel mode switching device of claim 1, wherein the travel mode includes other travel modes excluding the normal mode, the sport travel mode, and the towing travel mode.

3. The travel mode switching device of claim 2, wherein the other travel modes include an off-road travel mode.

4. A display unit of a travel mode switching device for a vehicle, the travel mode switching device configured to be switchable between a plurality of travel modes including a normal mode, a sport travel mod; and a towing travel mode, the travel mode switching device including a travel mode selection interface that allows a driver to select one of the travel modes and a towing detection sensor that detects a towing state, the display unit comprising:
 a display screen that displays an operation screen of the travel modes selectable by the travel mode selection interface,
 wherein the display unit is regulated by a processor configured to execute a travel mode regulating module so that, when the towing state is detected by the towing detection sensor, the normal mode and the towing travel mode are displayed as the selectable travel modes, and the sport travel mode is not displayed on the operation screen, and so that, when the towing state is not detected, the normal mode and the sport travel mode are displayed as the selectable travel modes, and the towing travel mode is not displayed on the operation screen.

5. The travel mode switching device of claim 4, wherein the travel mode includes other travel modes excluding the normal mode, the sport travel mode, and the towing travel mode.

6. The travel mode switching device of claim 5, wherein the other travel modes include an off-road travel mode.

* * * * *